(12) United States Patent
Tsai et al.

(10) Patent No.: US 8,602,631 B2
(45) Date of Patent: *Dec. 10, 2013

(54) LIGHT GUIDE APPARATUS FOR A BACKLIGHT MODULE

(75) Inventors: Chung-Lin Tsai, Taoyuan (TW);
Ming-Yuan Lee, Taoyuan (TW);
Tsung-Yung Hung, Taoyuan (TW);
I-Ping Huang, Taoyuan (TW)

(73) Assignee: Global Lighting Technologies Inc., Taoyuan (TW)

( * ) Notice: Subject to any disclaimer, the term of this patent is extended or adjusted under 35 U.S.C. 154(b) by 293 days.

This patent is subject to a terminal disclaimer.

(21) Appl. No.: 13/172,878

(22) Filed: Jun. 30, 2011

(65) Prior Publication Data
US 2012/0170318 A1 Jul. 5, 2012

Related U.S. Application Data

(63) Continuation-in-part of application No. 12/464,104, filed on May 12, 2009, now Pat. No. 7,997,784.

(51) Int. Cl.
*F21V 8/00* (2006.01)

(52) U.S. Cl.
USPC ............................................. 362/621; 362/630

(58) Field of Classification Search
USPC .................. 362/612, 613, 621, 630, 631, 97.3
See application file for complete search history.

(56) References Cited

U.S. PATENT DOCUMENTS 8,419,261 B2 * 4/2013 Tsai .............................. 362/621

* cited by examiner

*Primary Examiner* — David V Bruce
(74) *Attorney, Agent, or Firm* — Jianq Chyun IP Office

(57) ABSTRACT

A light guide apparatus for a backlight module is disclosed, which includes a light guide plate, a circuit having a plurality of conductive contacts integrated with the light guide plate, and a light source disposed on the light guide plate and electrically contacted to the plurality of conductive contacts.

20 Claims, 4 Drawing Sheets

LIGHT GUIDE APPARATUS FOR A BACKLIGHT MODULE

CROSS-REFERENCE TO RELATED APPLICATIONS

This application is a continuation-in-part application of and claims the priority benefit of a prior application Ser. No. 12/464,104, filed on May 12, 2009, now pending. The entirety of the above-mentioned patent application is hereby incorporated by reference herein and made a part of this specification.

BACKGROUND OF THE INVENTION

1. Field of the Invention

The present invention relates to a light guide structure including a light guide plate and a light source, and being adapted for a backlight module.

2. The Prior Arts

Backlight modules are now widely used in many kinds of electronic products. For example, displays of notebook computers, mobile phones, and liquid crystal televisions do not emit light by themselves, and require backlight modules for providing light sources.

A typical backlight module includes a light guide plate and a light source. Light emitting diodes (LED) are often employed serving as light sources of backlight modules for those electronic products demanding a relatively thin thickness. With respect to such a backlight module, the LED light source is positioned at a lateral side of the light guide plate. The light guide plate has a first surface and a second surface opposite to the first surface. A reflective sheet is provided at the first surface, and a plurality of optical sheets including a diffusing sheet and a prism sheet are provided at the second surface. An outer frame is provided for framing all of the components. In operation, the LED light source emits a light, and the light is inputted into light guide plate from the lateral side of the light guide plate. A part of the light is reflected by the reflective sheet, and sequentially passes through the diffusing sheet and the prism sheet, and is then outputted therefrom.

When serving for a backlight module having a relatively small area, the light sources are usually provided at one lateral side of the light guide plate. However, when serving for a backlight module having a relatively large area, if the light sources are only provided at one side of the light guide plate, the light inputted into the light guide plate gradually attenuates while being transmitted to the other side of the light guide plate. This often causes a nonuniform illuminating condition of the light guide plate. As such, a large size light guide plate is often provided with light sources at both sides for solving the problem of the single side light sources.

FIG. 1 is a schematic diagram illustrating a conventional backlight module including a light guide plate and light sources assembled together. Referring to FIG. 1, no matter the light sources are provided to one side, two sides, or even more sides of the light guide plate 1, the conventional backlight module is generally configured by providing LEDs 2 onto a circuit board 3, and then assembling the LEDs 2 and the circuit board together to the lateral side(s) of the light guide plate 1. Accordingly, in fabricating such a backlight module, the LEDs 2 must be previously welded to the circuit board 3. Then, the circuit board 3, together with the LEDs 2 welded thereon, is secured to the light guide plate 1. As such, the process of the fabrication is relatively complex, and needs a high fabrication cost.

SUMMARY OF THE INVENTION

A primary objective of the present invention is to provide a solution to the problem of the conventional backlight module, in which the fabrication process of providing the LEDs serving as light sources to the light guide plate is complex and costly.

An embodiment of the invention provides a light guide apparatus for a backlight module, which includes a light guide plate having a recessed compartment, a circuit arranged on the light guide plate, a light source, and a connector disposed in the recessed compartment for electrically connecting the light source and the circuit. The connector can be a close type socket with a back support or an open type socket without a back support. The circuit has a plurality of circuit contacts disposed on an inner surface of the recessed compartment. The connector includes a housing, a plurality of first connector contacts disposed on the housing in contact with the circuit contacts, and a plurality of second connector contacts disposed on the housing in contact with the light source. The first connector contacts may protrude the housing. The first connector contacts may be molded in the housing. The housing includes a plurality of sidewalls and a bottom portion to define a chamber for receiving the light source within, and at least one hook for positioning the light source in the chamber. The second connector contacts can be disposed at the sidewalls of the housing. The second connector contacts can be disposed at the bottom portion of the housing. The circuit can be arranged at a front surface of the light guide plate. The circuit can be arranged at a rear surface of the light guide plate. The circuit can be arranged at a side surface of the light guide plate. The recessed compartment can be a recess or a hole. The recessed compartment can be disposed at a lateral side of the light guide plate. The recessed compartment can be disposed adjacent to a lateral side of the light guide plate. The recessed compartment can be disposed near a center area of the light guide plate. The connector may include a pair of elastic arms connected to a pair of pins of the light source. The connector may include a pair of elastic pieces located in the recessed compartment and coupled to a pair of elastic pins of the light source.

BRIEF DESCRIPTION OF THE DRAWINGS

The present invention will be apparent to those skilled in the art by reading the following detailed description of a preferred embodiment thereof, with reference to the attached drawings.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
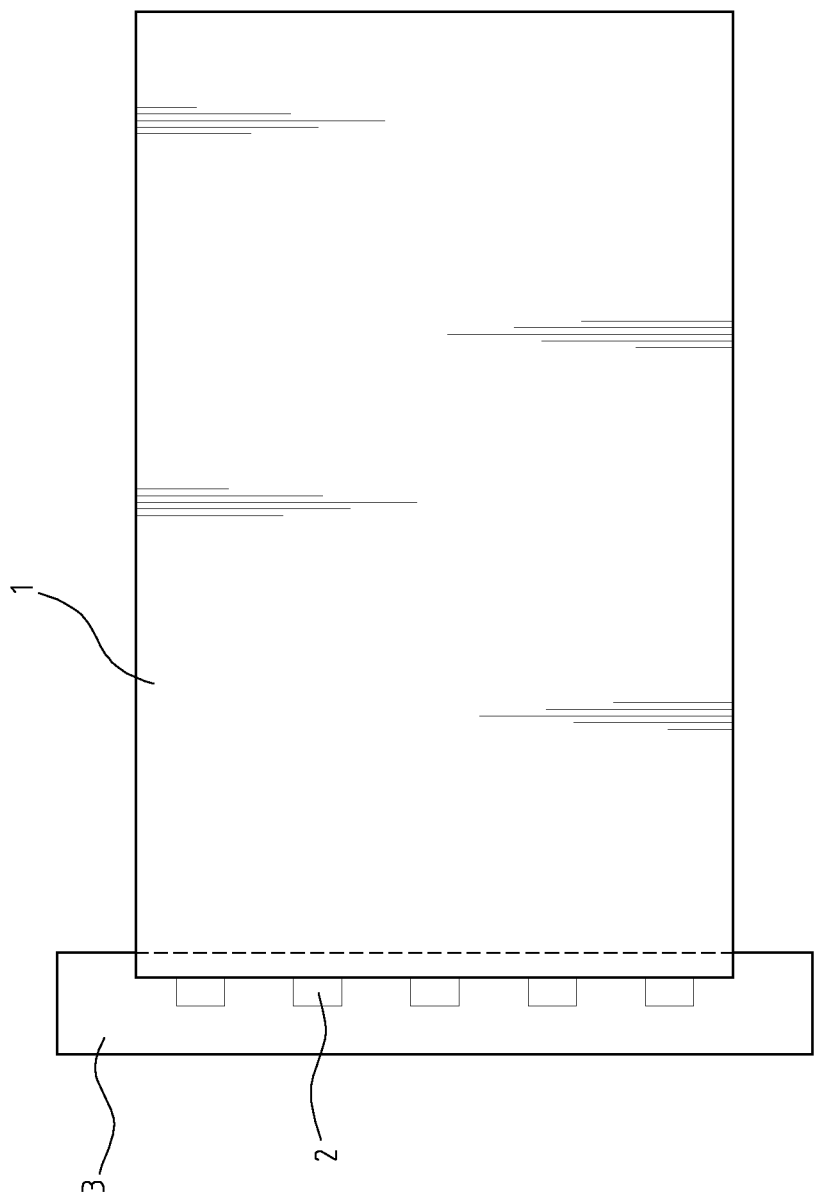
FIG. 1 is a schematic diagram of a conventional backlight module including a light guide plate and light sources assembled together.
Figure 2:
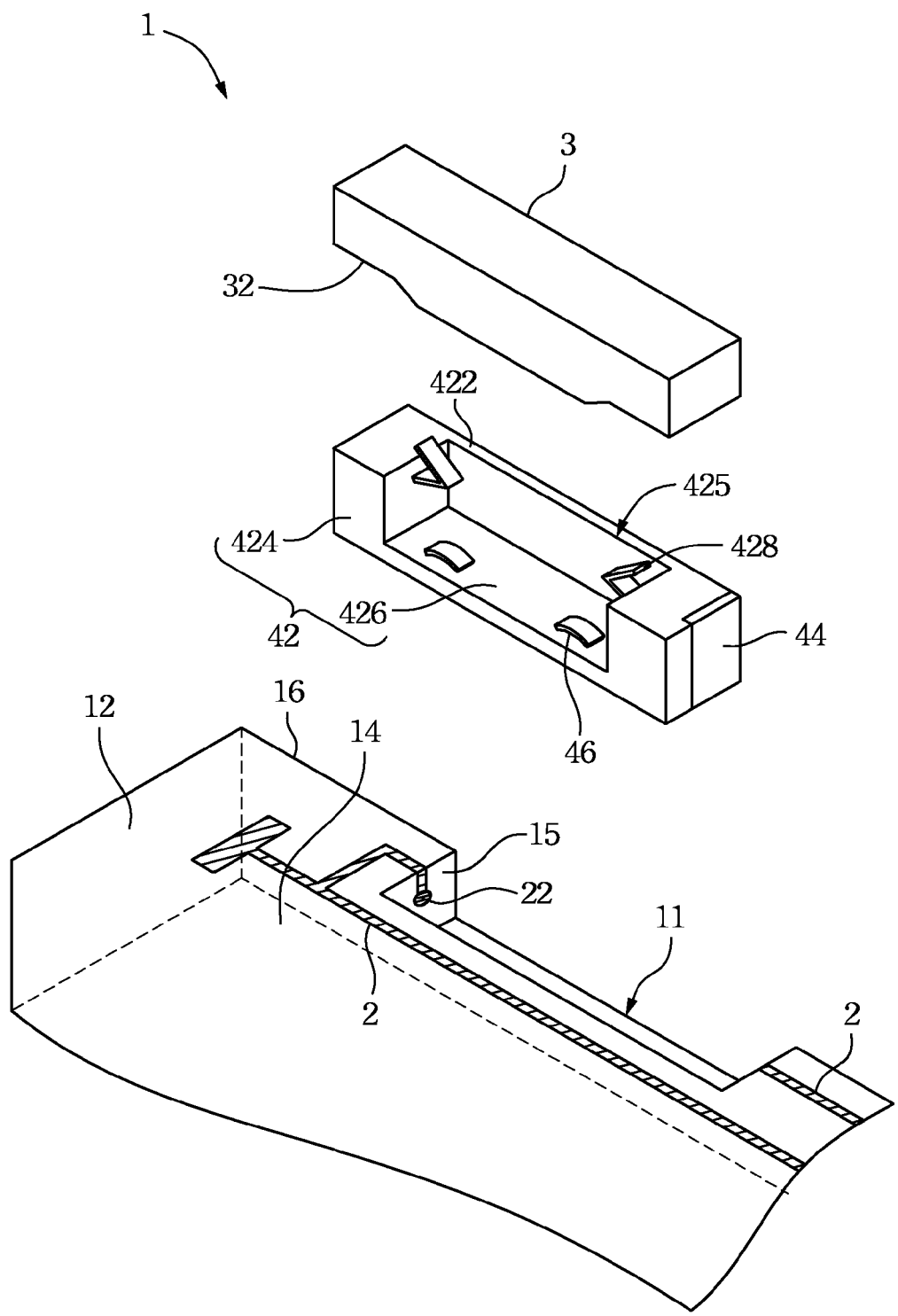
FIG. 2 is an explosive diagram of a first embodiment of the light guide apparatus for backlight module of the invention.

FIG. 2 is an explosive diagram of a first embodiment of the light guide apparatus for backlight module of the invention. The light guide apparatus for back light module includes a light guide plate 1, a circuit 2 arranged on the light guide plate 1, a light source 3, and a connector 4 for electrically connecting the light source 3 and the circuit 2.

The light guide plate 1 includes a front surface 12, a rear surface 14, and a side surface 16. The front surface 12 is a light-emitting surface of the light guide plate 1, i.e. the light is emitted from the front surface 12 of the light guide plate 1. The rear surface 14 is opposite to the front surface 12, and the light is mostly reflected by the rear surface 14. The side surface 16 connects the front surface 12 and the rear surface 14.

The light guide plate 1 has a recessed compartment for receiving the light source 3. The recessed compartment is a recess 11. The recess 11 is disposed at the lateral side of the light guide plate 1. The circuit 2 includes a plurality of circuit contacts 22. The circuit contacts 22 are disposed on an inner surface 15 of the recess 11. The circuit 2 is arranged on the front surface 12 of the light guide plate 1.

The connector 4 can be a close type socket with a back support 422. The connector 4 has a housing 42 with the back support 422. The housing 42 includes a plurality of sidewalls 424 and a bottom portion 426 to define a chamber 425 within. The chamber 425 is utilized for receiving the light source 3. The housing 42 further includes a plurality of hooks 428 connected to the sidewalls 424. The hooks 428 can couple to the light source 3 to position the light source 3 in the chamber 425.

The connector 4 includes a plurality of first connector contacts 44 disposed on the housing 42. The first connector contacts 44 are in contact with the circuit contacts 22 to electrically connect the connector 4 to the circuit 2. The first connector contacts 44 face the inner surface 15 of the recess 11. The first connector contacts 44 are molded in the housing 42.

The connector 4 includes a plurality of second connector contacts 46 disposed on the housing 42. The second connector contacts 46 are in contact with the light source 3 to electrically connect the connector 4 to the light source 3. The second connector contacts 46 disposed on the bottom portion 426 of the housing 42. The light source 3 can be a light emitting diode, and the second connector contacts 46 are in contact with the leads of the light emitting diode.

Figure 3:
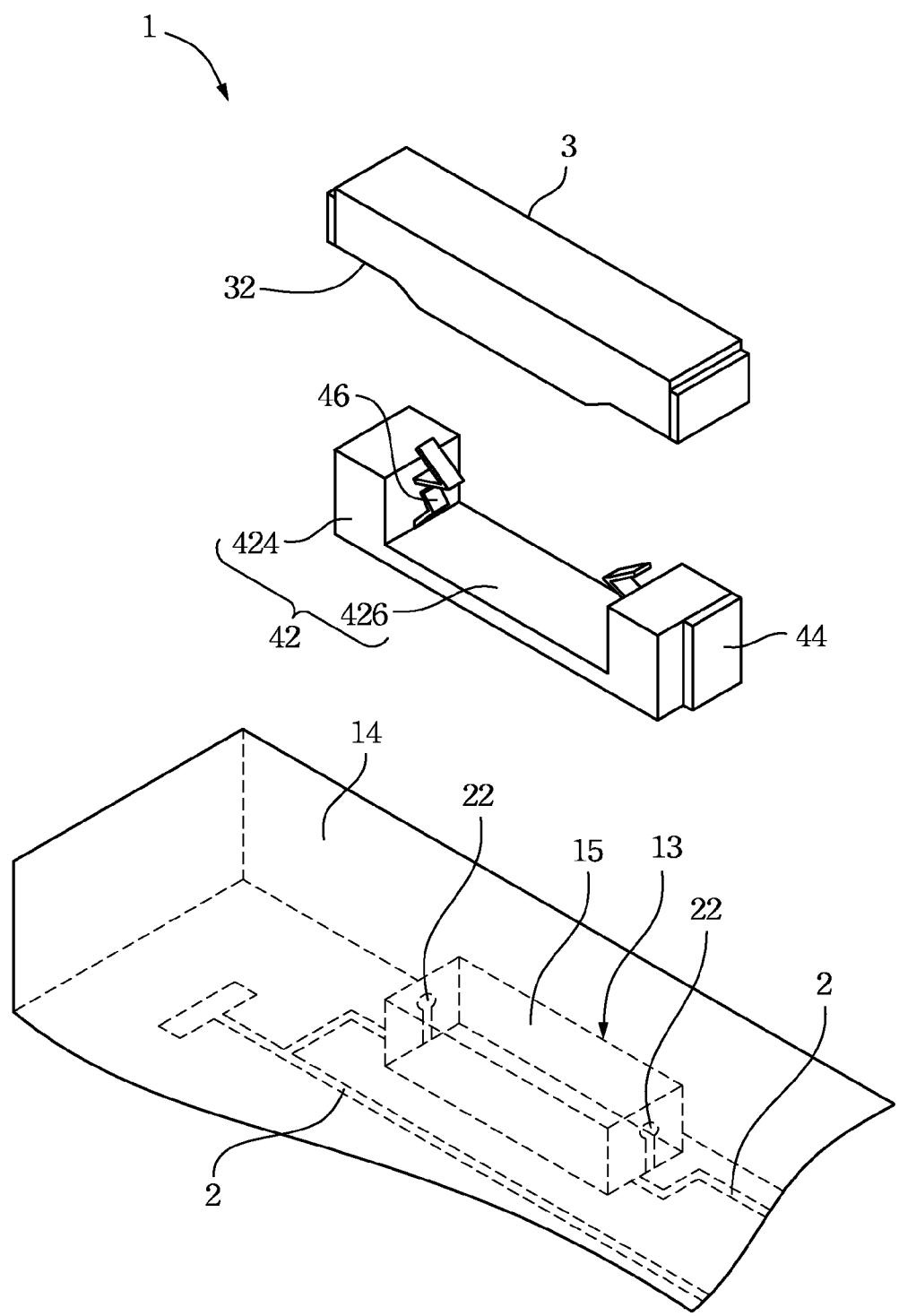
FIG. 3 is an explosive diagram of a second embodiment of the light guide apparatus for backlight module of the invention.

FIG. 3 is an explosive diagram of a second embodiment of the light guide apparatus for backlight module of the invention. The recessed compartment in this embodiment is a hole 13 passing through the light guide plate 1. The hole 13 is disposed adjacent a lateral side of the light guide plate 1. The circuit 2 is arranged at the rear surface 14 of the light guide plate 1. The circuit contacts 22 of the circuit 2 are disposed on the inner surface 15 of the hole 13.

The connector 4 in this embodiment is an open type socket without the back support 422 (see FIG. 2). The connector 4 is disposed in the hole 13. The connector 4 has the housing 42, the first connector contacts 44 disposed on the housing 42, and the second connector contacts 46 disposed on the housing 42. The first connector contacts 44 protrude the housing 42 and facing the circuit contacts 22. The second connector contacts 46 are disposed at the sidewalls 424 of the housing 42.

Although the light source 3 and recessed compartment are illustrated singular in this embodiment, the number of the light source 3 and the recessed compartment can be plural. Each of the recessed compartments can receive one or more light source.

Figure 4:
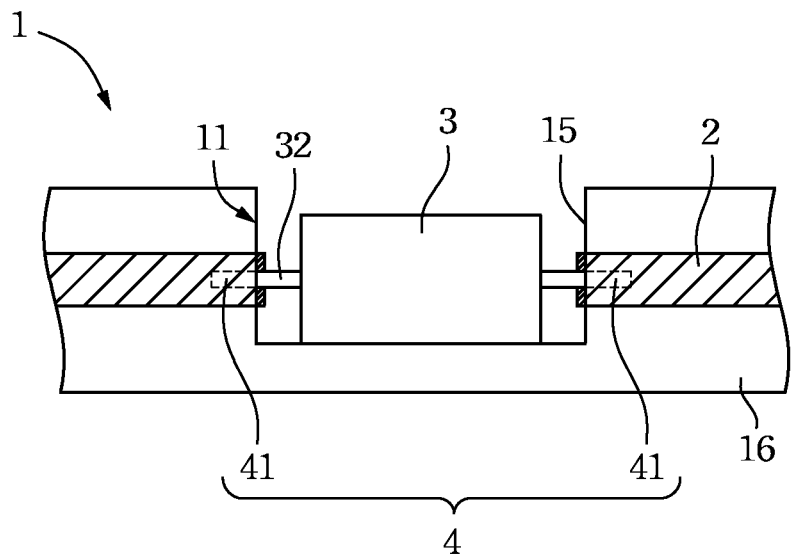
FIG. 4 is a sectional diagram of a third embodiment of the light guide apparatus for backlight module of the invention.

FIG. 4 is a sectional diagram of a third embodiment of the light guide apparatus for backlight module of the invention. The light guide apparatus includes the light guide plate 1 having the recessed compartment, the circuit 2 arranged on the light guide plate 1, the light source 3, and the connector 4 disposed in the recessed compartment for electrically connecting the light source 3 and the circuit 2.

The recessed compartment is the recess 11. The recess 11 is disposed near a center area of the light guide plate 1. The circuit 2 is arranged on the side surface 16 of the light guide plate 1. A part of the circuit 2 is disposed on the inner surface 15 of the recess 11.

The light source 3 can be a light emitting diode with a pair of pins 32. The connector 4 includes a pair of elastic arms 41. The elastic arms 41 are made of metal. The elastic arms 41 are connected to the pins 32 of the light source 3. The elastic arms 41 are inserted into the light guide plate 1 to position the light source 3 in the recess 11. The elastic arms 41 pass through the circuit 2 to electrically connect the light source 3 and the circuit 2.

Figure 5:
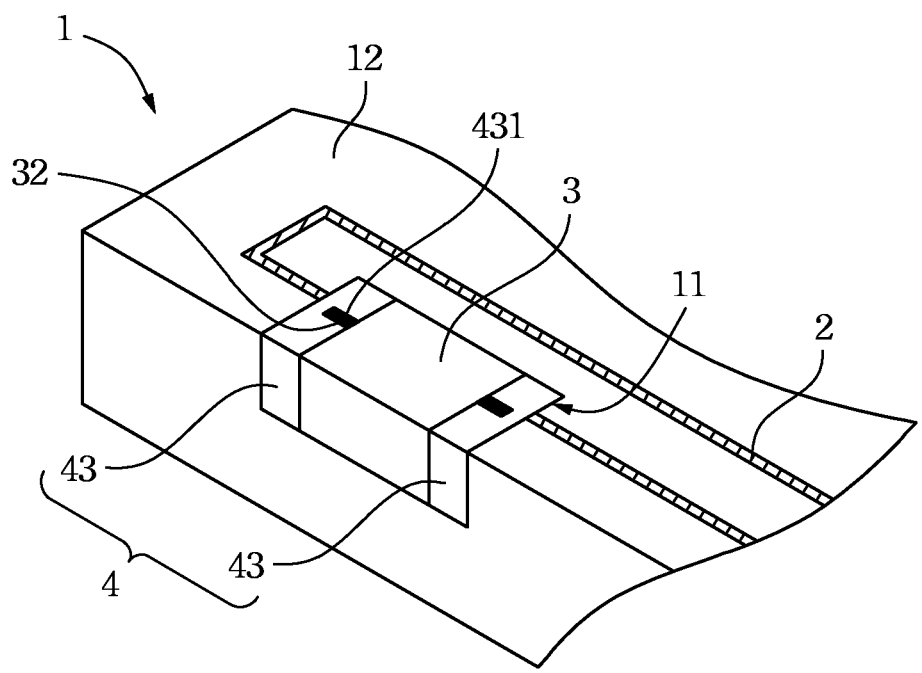
FIG. 5 is a schematic diagram of a fourth embodiment of the light guide apparatus for backlight module of the invention.

FIG. 5 is a schematic diagram of a fourth embodiment of the light guide apparatus for backlight module of the invention. The light guide apparatus includes the light guide plate 1 having the recessed compartment, the circuit 2 arranged on the light guide plate 1, the light source 3, and the connector 4 disposed in the recessed compartment for electrically connecting the light source 3 and the circuit 2.

The recessed compartment is the recess 11. The recess 11 is disposed at the lateral side of the light guide plate 1. The circuit 2 is disposed on the front surface 12 of the light guide plate 1. The connector 4 includes a pair of elastic pieces 43. The elastic pieces 43 are disposed in the recess 11. The elastic pieces 43 are made of metal. The elastic pieces 43 are disposed on opposite sides of the recess 11 and touch the circuit 2. The elastic pieces 43 couple to the light source 3 to position the light source in the recess 11. Each elastic piece 43 has a notch 431. The light source 3 can be a light emitting diode with a pair of pins 32. The light source 3 is inserted into the recess 11 and is clamped between the elastic pieces 43. The pins 32 of the light source 3 are coupled to the notches 431 of the elastic pieces 43.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A light guide apparatus for a backlight module comprising:
    a light guide plate having a recessed compartment;
    a circuit arranged on the light guide plate;
    a light source; and
    a connector disposed in the recessed compartment for electrically connecting the light source and the circuit.

2. The light guide apparatus of claim 1, wherein the connector is a close type socket with a back support.

3. The light guiding apparatus of claim 1, wherein the connector is an open type socket without a back support.

4. The light guide apparatus of claim 1, wherein the circuit has a plurality of circuit contacts disposed on an inner surface of the recessed compartment.

5. The light guide apparatus of claim 4, wherein the connector comprises:

a housing;

a plurality of first connector contacts disposed on the housing in contact with the circuit contacts; and a plurality of second connector contacts disposed on the housing in contact with the light source.

6. The light guide apparatus of claim 5, wherein the first connector contacts protrude the housing.

7. The light guide apparatus of claim 5, wherein the first connector contacts are molded in the housing.

8. The light guide apparatus of claim 5, wherein the housing comprises:

a plurality of sidewalls and a bottom portion to define a chamber for receiving the light source within; and at least one hook for positioning the light source in the chamber.

9. The light guide apparatus of claim 8, wherein the second connector contacts are disposed at the sidewalls of the housing.

10. The light guide apparatus of claim 8, wherein the second connector contacts are disposed at the bottom portion of the housing.

11. The light guide apparatus of claim 1, wherein the circuit is arranged at a front surface of the light guide plate.

12. The light guide apparatus of claim 1, wherein the circuit is arranged at a rear surface of the light guide plate.

13. The light guide apparatus of claim 1, wherein the circuit is arranged at a side surface of the light guide plate.

14. The light guide apparatus of claim 1, wherein the recessed compartment is a recess.

15. The light guide apparatus of claim 1, wherein the recessed component is a hole.

16. The light guide apparatus of claim 1, wherein the recessed compartment is disposed at a lateral side of the light guide plate.

17. The light guide apparatus of claim 1, wherein the recessed compartment is disposed adjacent to a lateral side of the light guide plate.

18. The light guide apparatus of claim 1, wherein the recessed compartment is disposed near a center area of the light guide plate.

19. The light guide apparatus of claim 1, wherein the connector comprises a pair of elastic arms connected to a pair of pins of the light source.

20. The light guide apparatus of claim 1, wherein the connector comprises a pair of elastic pieces located in the recessed compartment and coupled to a pair of elastic pins of the light source.

* * * * *